United States Patent [19]
Platzer, Jr.

[11] 3,992,940
[45] Nov. 23, 1976

[54] SOLID STATE FLUID FLOW SENSOR

[75] Inventor: George E. Platzer, Jr., Southfield, Mich.

[73] Assignee: Chrysler Corporation, Highland Park, Mich.

[22] Filed: Nov. 2, 1973

[21] Appl. No.: 412,216

[52] U.S. Cl. ............................................. 73/204
[51] Int. Cl.² ........................................... G01F 1/68
[58] Field of Search ................... 73/204, 362 SC; 307/310

[56] References Cited
UNITED STATES PATENTS

| | | | |
|---|---|---|---|
| 2,864,053 | 12/1958 | Woodworth | 73/362 |
| 3,085,431 | 4/1963 | Yerman et al. | 73/204 |
| 3,092,998 | 6/1963 | Barton | 73/362 |
| 3,258,760 | 6/1966 | Carlson et al. | 73/204 X |
| 3,316,765 | 5/1967 | Trolander et al. | 73/362 |
| 3,320,551 | 5/1967 | Miller | 307/310 X |
| 3,330,158 | 7/1967 | Simonyan | 73/362 |
| 3,393,870 | 7/1968 | Jeffrey | 307/310 X |
| 3,576,492 | 4/1971 | Roo | 307/310 |
| 3,604,957 | 9/1971 | Satula | 73/204 |
| 3,648,518 | 3/1972 | Hans | 73/204 |
| 3,680,377 | 8/1972 | Lightner | 73/204 |
| 3,733,897 | 5/1973 | Herzl | 73/204 |
| 3,797,480 | 3/1974 | Williams | 73/204 X |
| 3,800,592 | 4/1974 | Jones, Jr. | 73/204 |
| 3,830,104 | 8/1974 | Gav | 73/204 |
| 3,881,181 | 4/1975 | Khajezadeh | 73/362 |

FOREIGN PATENTS OR APPLICATIONS

| | | | |
|---|---|---|---|
| 1,098,077 | 1/1968 | United Kingdom | 73/204 |
| 1,121,129 | 7/1968 | United Kingdom | 73/204 |

OTHER PUBLICATIONS

Steedman, "A Solid State Oceanographic Current Meter", Journal of Physics (G.B.), vol. 5, No. 12, 12/72, pp. 1157–1162.
CGS/Datametrics, Bulletin 600, 1971, pp. 4 and 18.
Bowes, "Variable Resistance Sensors Work Better with Constant Current Excitation", Instrumentation Technology, presented, 10/66.

*Primary Examiner*—Herbert Goldstein
*Attorney, Agent, or Firm*—Talburtt & Baldwin

[57] ABSTRACT

A fluid flow sensor fabricated by integrated circuit techniques is positioned within fluid flow passages for measuring the mass flow of fluid therethrough. The sensor comprises three solid state circuit devices wherein two are fabricated on a chip separate from the third device.

The first device is responsive to forced convective heat transfer by the fluid flowing thereover for generating a first electrical signal. The third device is responsive to temperature of the fluid thereover for generating a second signal and the second device is responsive to both said first and second electrical signals for maintaining said first device at a predetermined temperature above said third device.

A fuel metering system for internal combustion engines is described utilizing a fluid flow sensor for measuring the mass flow of both fuel and air into the throttle body. Circuit means responsive to said sensors operate to maintain a predetermined fuel-air ratio in said internal combustion means.

7 Claims, 8 Drawing Figures

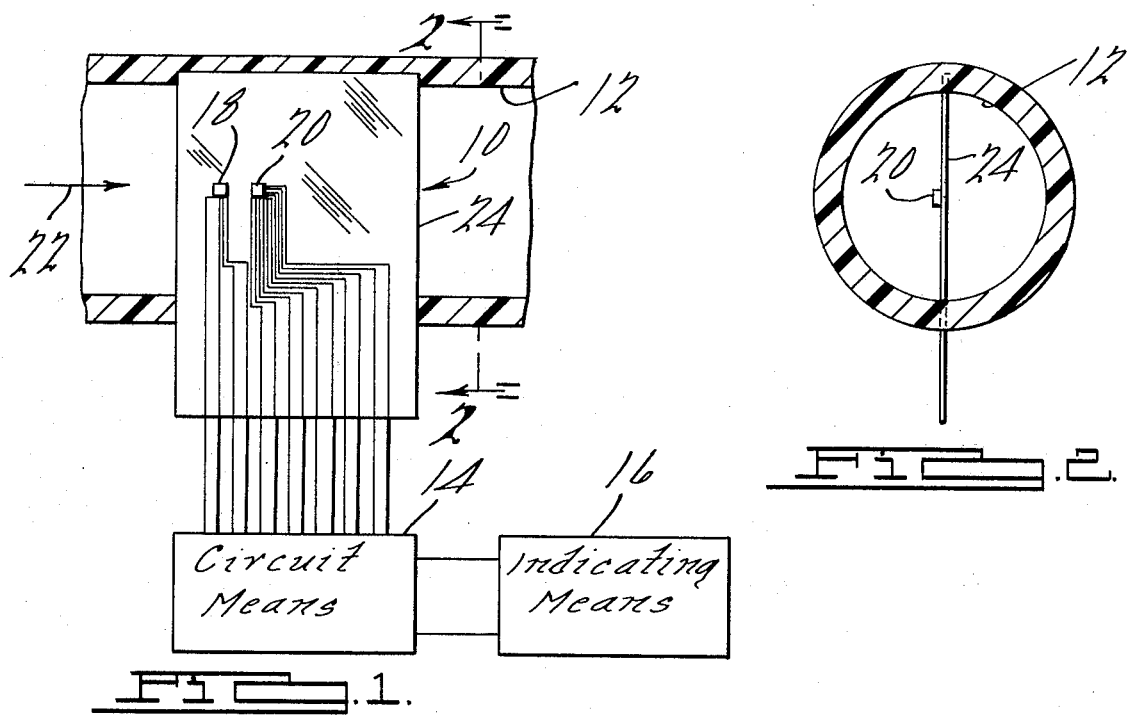
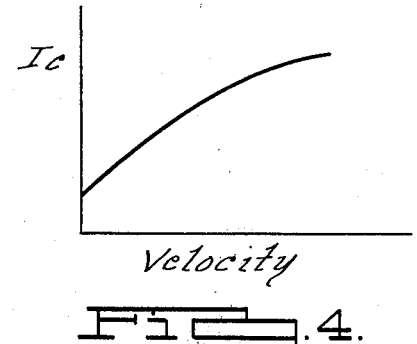
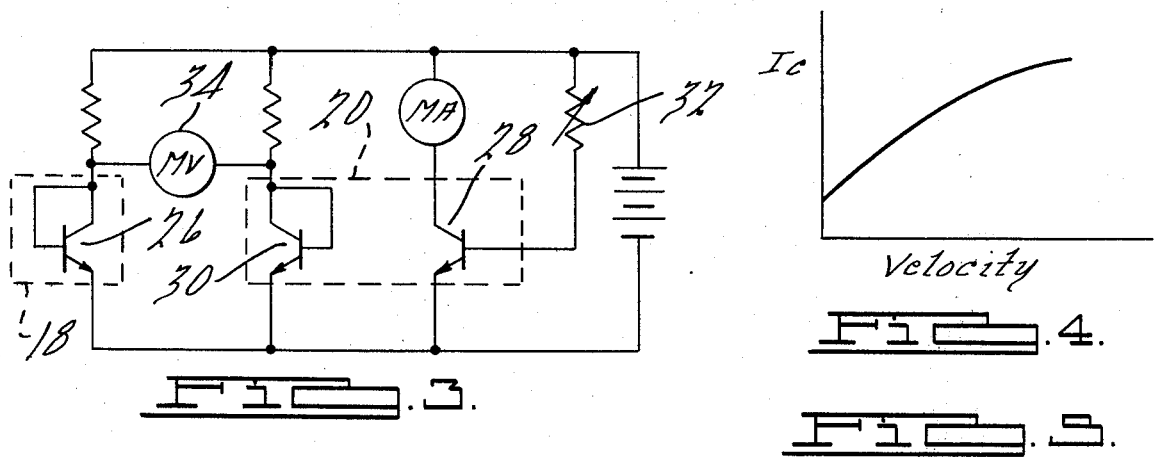
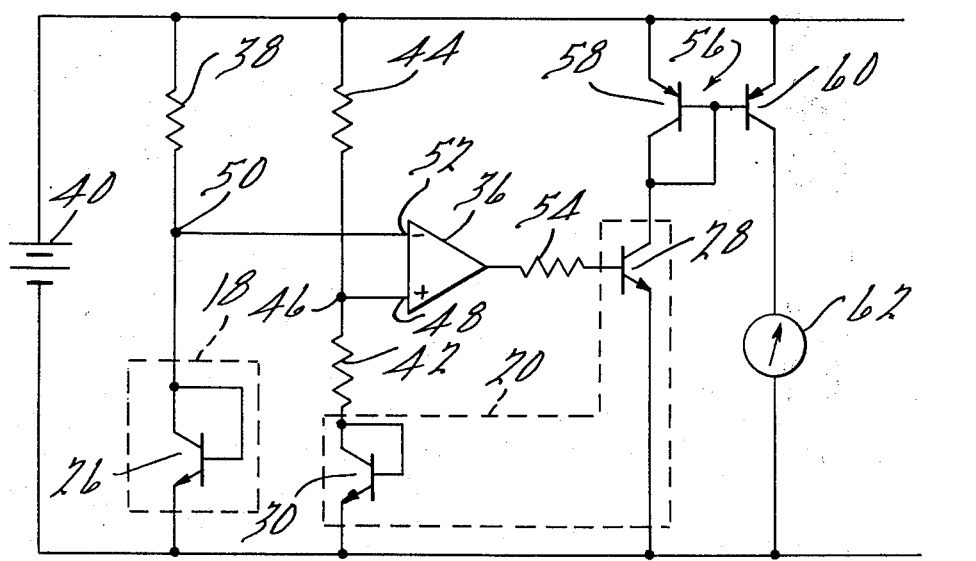

SOLID STATE FLUID FLOW SENSOR

FIELD OF INVENTION

This invention relates to fluid flow sensors and in particular to solid state sensors for measuring mass fuel and air flow into internal combustion engines.

SUMMARY OF INVENTION

It is an object of the invention to fabricate a mass fluid flow sensor for measuring the mass rate of fluid flow in a conduit while minimizing the degree of obstruction to the flow of fluid.

It is another object of the invention to utilize solid state integrated circuit techniques to the fabrication of a mass fluid flow sensor.

It is still another object of the invention to provide a fuel metering system for internal combustion engines utilizing solid state fluid sensors.

The principle of the present invention is that forced convective heat transfer from a particular solid state device varies directly with the mass flow rate of fluid passing thereby. Three solid state devices fabricated according to integrated circuit techniques are positioned such that one chip has one device and another closely adjacent chip has two devices. The first chip has a solid state diode device which is electrically connected to an external current source for conduction. The second chip has both a solid state diode electrically connected to an external current source for conduction and a transistor utilized as a heater to raise the temperature of the second solid state diode a predetermined amount over that of the first diode. As the fluid flows over the first diode, the impedance of the diode is determined by the temperature of the fluid and a first electrical signal is generated reflecting that temperature.

As the fluid flows over the second diode which is at a known temperature difference from said first diode, the amount of heat transferred from the diode to the fluid by forced convection causes a second electrical signal to be generated. These two signals are compared and in conjunction with an amplifier generate a third signal which is applied to the base of the transistor on the second chip. As the base current is changed, the collector current through the transistor generates heat to maintain the second diode at the predetermined temperature difference between the diodes. The amount of current through the collector of the transistor is proportional to the mass rate of the fluid flowing over the sensor.

DESCRIPTION OF THE DRAWINGS

In the Drawings:

FIG. 1 is a block diagram of the fluid flow sensor system of the present invention;

FIG. 2 is an end view of a tubular passageway showing the axial location of the sensor;

FIG. 3 is a basic circuit diagram illustrating the concept of the system;

FIG. 4 is a graph of the fluid velocity as a function of collector current in FIG. 3;

FIG. 5 is a circuit schematic of the preferred embodiment of the system means of FIG. 1;

DETAILED DESCRIPTION

Figure 6:
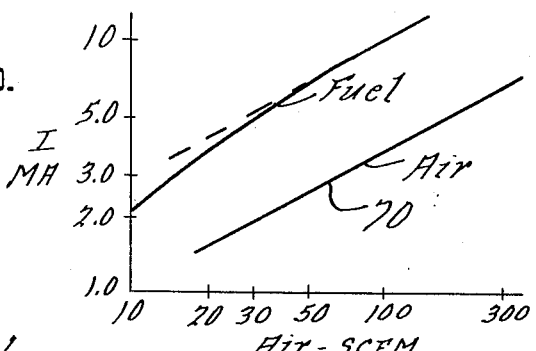
FIG. 6 is a log-log graph illustrating the relationship at predetermined conditions of fuel and air flow as a function of current.

Referring to the Figures by the characters of reference, there is illustrated in FIG. 1 a block diagram of a fluid flow sensor system of the present invention. The system comprises a sensor 10 mounted in a tubular passageway 12, a circuit means 14 electrically connected to the sensor and external to the passageway and an indicating means 16 responsive to the electrical characteristics of the circuit means for indicating the fluid flow through the passageway.

As illustrated in FIG. 1, the tubular passageway 14 may in fact be a fuel line such as found in a motor vehicle. In this application, the cross sectional diameter of the passageway is on the order of 0.375 inches and all of the fuel flowing in the line flows past the sensor.

If the system is being used to measure larger volume flows such as air in a motor vehicle carburetion system, the tubular passageway containing the sensor may be a portion of the total air flow conduit. In one such application, the tubular passageway is on the order of 0.37 inches cross-sectional diameter and the air flow conduit has an internal diameter of 2.750 inches.

The sensor means 10 of the present invention comprises two integrated circuit chips 18 and 20 each of which comprises a body of semiconductive material embodying one or more semiconductor devices. The chips are mounted adjacent to each other and, as illustrated in FIG. 1, the chips are axially aligned with respect to flow of the fluid. The direction of air flow is from left to right in FIG. 1 as indicated by the arrow 22.

The chips 18 and 20 are fabricated by integrated circuit techniques and are bonded to the printed circuit platform 24 by means of beam leads (not shown). The printed circuit platform 24, in order to reduce the hindrance to fluid flow and minimize thermal conductivity out of the chips, is a thin polyamide film extending diametrically across the tubular passageway 12. In practice, the tubular passageway 12 comprises two halves between which the platform 24 is held.

The first integrate circuit chip 18 is a diode or diode connected transistor 26. If a diode connected transistor is used, the collector and base lead are electrically connected together. The function of this chip 18 is to monitor the static or ambient temperature of the fluid. As will hereinafter be shown, a constant current is supplied to the diode 26 and the voltage drop thereacross is directly responsive to the temperature of the diode.

The second integrated circuit chip 20 comprises a transistor 28 and a second diode or diode connected transistor 30. Both the transistor 28 and the diode 30 are fabricated on the same substrate and are physically positioned as close together as possible. The function of the transistor 28 is to heat the chip and the diode 30 to a predetermined temperature above the temperature of the first integrated circuit chip 18, which is unheated and therefore at the ambient temperature of the fluid. The diode 30 is supplied a constant current and the voltage drop thereacross is a function of the temperature of the diode.

The transistor 28 is supplied a predetermined collector to emitter voltage level. By supplying base current to the transistor 28, collector current is made to flow from the collector to the emitter junction. This current causes a power dissipation in the transistor 28 which heats the chip on which it is fabricated. Since the collector to emitter voltage remains constant, the power dissipated will be proportional to the amount of collector current. This power dissipation and subsequent heating raises the temperature of the second chip 20 above the level which would be observed if the transisitor 28 were not conducting. Through the circuit means 14, a given temperature difference is maintained as the fluid flows through the passageway 12; however, the amount of transistor 28 collector current will vary as the fluid carries heat away from the second chip 20 requiring additional power to maintain the temperature difference. In the preferred embodiment, the transistor 28 is heated to a certain temperature by the collector current to raise the temperature of the second chip 20° centigrade above the temperature of the first chip 28. As the fluid flows over the second chip 20, its temperature tends to decrease and, therefore, the amount of collector current in the transistor 28 must increase to maintain the 20° difference. By measuring the amount of collector current, the rate of fluid flow of the fluid can be calibrated.

In the circuit of FIG. 3, a constant current is passed through the two diode connected transistors 26 and 30. The transistor 28 is brought into conduction by adjusting the base resistance 32. As the collector current increases, the temperature of the second chip 20 also increases. This increase in temperature causes a smaller voltage drop across the second diode 30 than across the identically fabricated first diode 26. The millivolt meter 34 between the collectors or anodes of the diodes 26 and 30 is used to indicate the difference in voltage crop across the diodes.

In one test to calibrate the sensor, the base resistor 32 was increased until the millivolt meter 34 measured a 40 millivolt difference with no fluid flow. The amount of collector current was noted. The rate of fluid flow was then increased in known increments. As the flow increased, the base resistor 32 was changed to maintain the 40 mv difference. At each flow level, the collector current was noted when the 40 mv level was achieved. These values were plotted on the graph of FIG. 4. For a given fluid, the sensor 10, which is now calibrated, can be placed in a fow passageway of unknown fluid velocities as illustrated in FIGS. 1 and 2, and by measuring the current through the collector of the transistor 28 with the 40 millivolt drop maintained between the two diodes 26 and 30, the velocity of the fluid is determined.

FIG. 5 illustrates a more complex and more sophisticated circuit means for the system of FIG. 1. An operational amplifier 36 is used to respond to the voltage drops across the diodes 26 and 30 and thereby control the base current to the heater transistor 28.

The first diode 26 has a large resistor 38 electrically connected in series between its collector-anode and a source of voltage 40. The second diode 30 has a small resistor 42 electrically connected in series with a large resistor 44 between its collector anode and the source of voltage 40. The large resistors 38 and 44 provide an essentially constant current through each diode 26 and 30. The small resistor 42 provides means for setting the temperature difference between the diodes 26 and 30. The junction 46 between the large and small resistors 42 and 44 is electrically connected to the non-inverting input 48 of the operational amplifier 36 and the junction 50 between the large resistor 38 and first diode 26 is electrically connected to the inverting input 52 of the operational amplifier 36.

The output of the operational amplifier 36 is electrically connected through a resistor 54 to the base of the heating transistor 28. The collector of the heating transistor 28 is connected through a current mirror 56 to the voltage source 40. The current mirror 56 comprises a pair of matched transistors 58 and 60 wherein the collector currents through each transistor 58 and 60 are equal. The indicating means 62 is electrically connected in series with the collector of the second transistor 60 of the current mirror 56. Both transistors 58 and 60 of the current mirror 56 are matched transistors so that the emitter base voltage of one equals the emitter base voltage of the second at the same current level.

As the fluid flows over the sensor 10, the temperature of the first diode 26, which is unheated, remains at the ambient temperature of the fluid while the temperature across the second diode 30 tends to decrease. This decrease in temperature causes an increase in the voltage drop across the second diode 30 thereby unbalancing the operational amplifier 36 causing additional or greater output current to flow out of the amplifier 36 and into the base of the heater transistor 28. This increase in base current causes increased collector current and the heater transistor 28 dissipates more power; therefore, heating the chip upon which it is fabricated. By controlled heating of the chip, the temperature of the second diode 30 is maintained at a constant value above the first diode 26.

The current through the collector of the heater transisitor 28 is proportional to the mass flow of the fluid over the second diode 30 and thereby through the conduit. In the two transistors 58 and 60 comprising the current mirror 56, the collector current in each transistor 58 and 60 is equal and in this manner, the measuring circuit or indicating means 62 electrically connected to the collector of the second transistor 60 does not affect the voltage in the heater transistor 28 circuit.

The above described circuit performs the following functions necessary for a fluid flow sensor of the present invention.

1. Compares two diode voltages with a reference voltage.
2. Provides a reference voltage proportional to the difference in temperature desired.
3. Provides additional heater power if the temperature difference is less than that desired.
4. Conversely reduces heater power if the temperature difference is more than heat desired.
5. Produces an output current or voltage proportional to the heater power.

In the construction of the sensor 10, care must be taken to minimize the heat conduction out of the two chips 18 and 20. This is accomplished by the mounting of the chips by beam lead techniques on polyimide film to minimize conduction and maximize forced convection.

Contamination of the sensor 10 by the fluids being measured must be prevented. Using silicon nitride passivated chips 18 and 20 and gold plating can prevent most contamination. Other techniques may also be used according to the fluid to be measured.

The principle of the present sensor is that the forced convective heat transfer varies directly with the mass flow rate of the fluid over a heated surface. By using this type of fluid sensor, the measured flow rate does not have to be compensated for density changes in the fluid.

Referring to FIG. 6, there is shown a graph on log-log scales of measurements taken for both fuel and air using a sensor 10 of the present invention. This graph indicates the linearity of the device for use in a fuel metering system for internal combustion engines.

Figure 7:
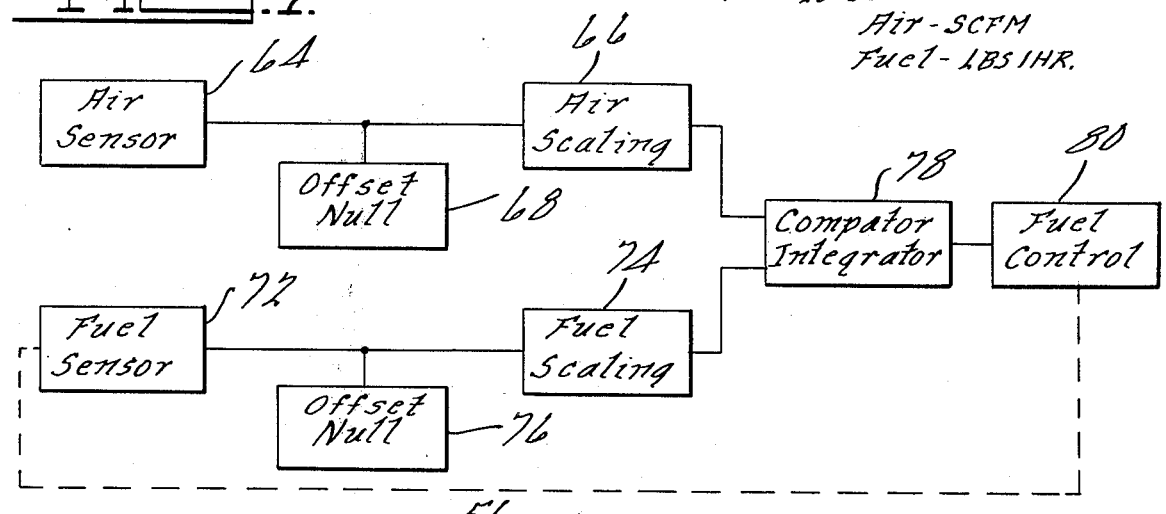
FIG. 7 is a block diagram of a fuel metering system for an internal combustion engine utilizing the fluid flow sensor of FIG. 1.

FIG. 7 is a block diagram of a fuel metering system for an internal combustion engine utilizing the sensor 10 of the present invention for both fuel and air measurements. The amount of air entering the throttle body of the engine is measured by the air sensor 64. The amount of air is determined by the position of the throttle valve as determined by the engine operator.

The output of the air sensor 64 is supplied to both an air scaling circuit 66 and to an offset null circuit 68. The air scaling circuit 66 adjusts the nominal output signal of the air sensor 64 at a given voltage level at a normal or predetermined operating condition. The offset null circuit 68 operates to displace the air curve 70 of FIG. 6 so that at zero air flow the signal from the air sensor 64 is absorbed by the offset null circuit 68 and not by the scaling circuit 66. At all other valves of air flow, the offset null circuit 68 "directs" the signal from the air sensor 64 to the scaling circuit 66.

The fuel sensor 72 is positioned in the fuel delivery lines to the engine and measures the amount of fuel flowing therein. The signal from the fuel sensor 72 is applied to both the fuel scaling 74 circuit and the fuel offset null 76 circuit. The function and operation of these two circuits 74 and 76 are identical to the similar circuits in the air sensor portion of the system.

The outputs from both the air scaling circuit 66 and the fuel scaling circuit 74 are brought together in a comparator-integrator 78. The comparator 78 functions to control a fuel control unit 80 such as a pump or valve in response to any voltage difference in the signals to the comparator 78.

The system of FIG. 7 functions to maintain a desired fuel-air ratio to an internal combustion engine in response to the amount of air entering the engine. The more air entering the engine, the more fuel is delivered by the fuel control 80. This increased fuel is measured by the fuel sensor 72 generating an electrical voltage signal to the comparator 78. This closes the control loop and the amount of fuel entering the engine is determined by the amount of air called for by the operator of the engine.

The normal or predetermined condition at which the air and fuel scaling circuits 66 and 74 are adjusted represent the desired fuel-air ratio at a predetermined first engine speed. This ratio is determined by measuring the CO emission level in the exhaust system of the engine. The engine was then operated at a second condition and second engine speed substantially different than the first condition and first engine speed and the fuel-air ratio was checked. The nominal conditions are for a 1% CO level across the operating range of the engine. Differences in CO level are eliminated by changing the scaling circuit values.

Figure 8:
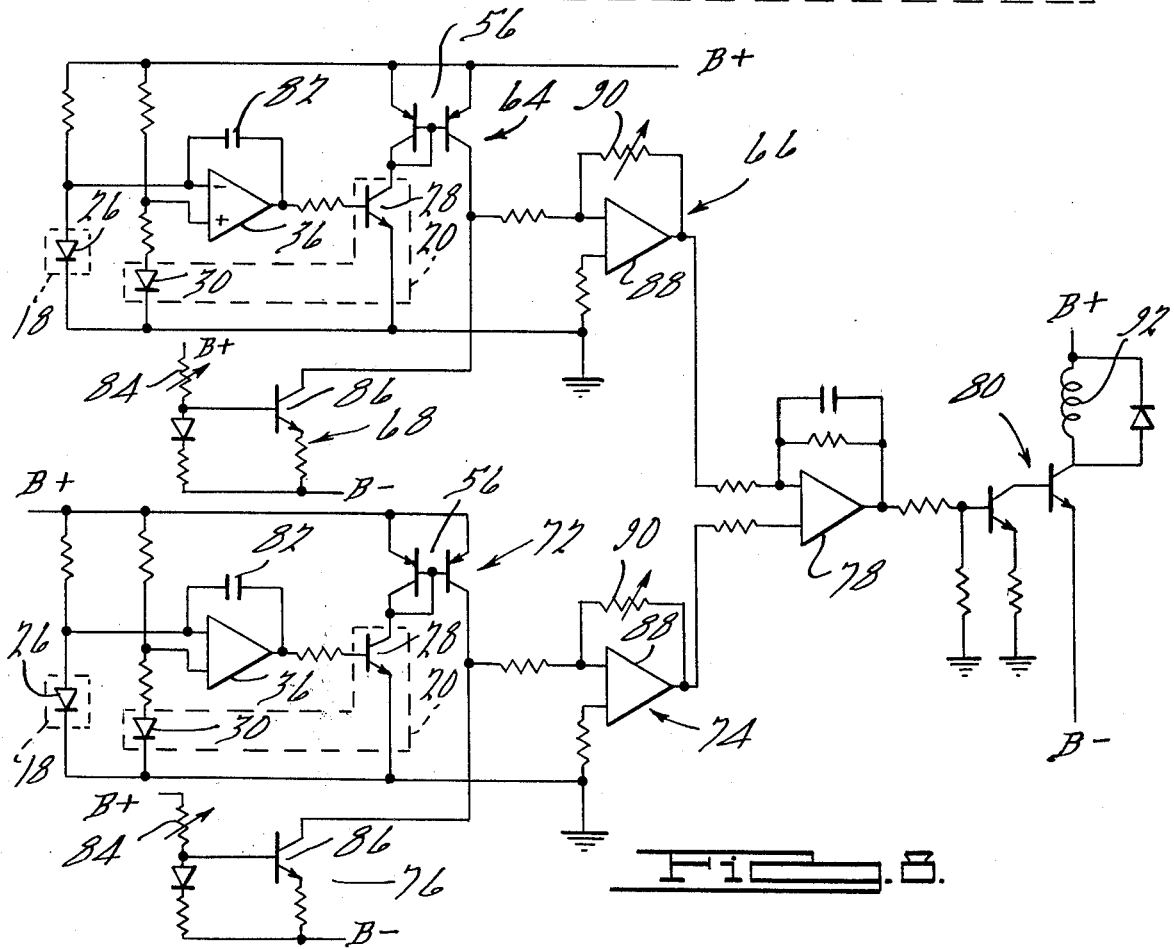
FIG. 8 is the schematic of the system of FIG. 7.

FIG. 8 is a schematic of the fuel metering system of FIG. 7 wherein both the air and fuel sensors 64 and 72 are identical to that illustrated in FIG. 5 with the sole exception of a feedback capacitor 82 between the inverting input and output of the operational amplifiers 36.

The base resistor 84 in the offset null circuits 68 and 76 adjusts the operation of the null transistor 86 such that at zero flow, the current from the current mirror 56 is absorbed by the transistor 86. At all other flow levels, the current from the current mirror 56 will flow into the operational amplifier 88 of the scaling circuits 66 and 74. The adjustable feedback resistor 90 is used to initially set the fuel-air ratio signal levels so that the voltage at the inputs to the comparator-integrator 78 are equal at the desired fuel-air ratio.

The comparator-integrator 78 operates to supply output current in response to the voltage difference at its inputs. The output of the comparator-integrator 78 is supplied to a fuel control 80 which may be a solenoid 92 operated valve in the fuel line or a pump delivering fuel through the lines. The output level of the comparator-integrator 78 determines the amount of opening of the valve or the speed of the pump.

When the throttle is opened, more air enters into the throttle body. The fuel delivery must be increased to maintain the desired fuel-air ratio. The fuel control unit 80 causes more fuel to be delivered which is sensed by the fuel sensor 72. The system operates to keep the difference voltage at the input of the comparator 78 nearly zero. The difference is only enough to supply the required fuel flow.

The feedback capacitors 82 in both the fuel and air sensors 64 and 72 function to provide dampening of the system. Without these capacitors, the sensor signals would respond to every fluctuation in the flowing fluid.

The current mirror 56 circuits may be other forms than the matched transistors illustrated. One such form may be the addition of a small value resistor in the emitters of the current mirror 56 transistors. These resistors (not shown) allow scaling and swamp temperature effects if discrete devices are used.

There has thus been shown and described a fluid flow sensor for measuring the flow rates of a fluid by the quantity of convected heat transfer from the sensor elements. A fuel metering system is described utilizing the sensors in both the air and fuel lines to the internal combustion engine.

What is claimed is:
1. A solid state fluid flow sensor for measuring the mass flow of a fluid through a conduit, said sensor comprising:
 a thin film insulative supporting member in the conduit;
 a first integrated circuit chip mounted on said member, said first chip having a first diode-connected transistor temperature sensing means integral therewith for monitoring the ambient temperature of the fluid flowing past the first circuit chip and generating an electrical signal proportional to said fluid ambient temperature;
 a second integrated circuit chip located adjacent said first chip on said member, said second chip having a second diode-connected transistor temperature sensing means and a transistor heating means integral therewith for heating the second chip, said second temperature sensing means generating a second electrical signal proportional to the temperature to which said second chip is heated;
 circuit means connected to said first and second chips supplying an amount of current to said transistor heating means for heating and maintaining said second chip at a predetermined constant temperature difference from said first chip above the ambient fluid temperature in response to the voltage drop across said first and second temperature sensing means; and indicating means responsive to the amount of current supplied to said transistor heating means to indicate the mass fluid flow through the conduit, said current varying in proportion to changes in the mass fluid flow.

2. A solid state fluid flow sensor according to claim 1 wherein said first temperature sensing means is conductively connected to a first constant current source.

3. A solid state fluid flow sensor according to claim 2 wherein said second temperature sensing means is electrically connected to a second constant current source, said heating means is electrically connected to a voltage source for conduction between its collector and emitter leads and the dissipation of power in said transistor heats said second solid state diode temperature sensing means, and wherein said circuit means includes means to vary the conductivity of said transistor to maintain said predetermined temperature difference between said first and second temperature sensing means.

4. A solid state fluid flow sensor according to claim 3 wherein said transistor conductivity varying means comprises an operational amplifier having its inverting input terminal electrically connected between said first current source and said first temperature sensing means, its non-inverting input terminal electrically connected between said second current source and said second temperature sensing means and its output terminal electrically connected to the base lead of said heater transistor on said second chip, said amplifier responsive to the voltage difference across its input terminals for supplying base current to said heater transistor.

5. A solid state fluid flow sensor according to claim 4 wherein said indicating means is responsive to the current flowing in the collector-emitter circuit of said heater transistor.

6. A solid state fluid flow sensor apparatus responsive to the mass flow rate of a fluid through a conduit, and comprising:

a supporting member in the conduit;

a first integrated circuit chip mounted on said member and having a first solid state diode-connected transistor thereon connected to a first constant current source for monitoring the ambient temperature of the fluid and generating an electrical signal proportional to said temperature;

a second integrated circuit chip located adjacent said first chip on said member and having a second solid state diode-connected transistor thereon connected to a second constant current source, said second chip also having a transistor heating means integrally formed thereon and electrically connected to a voltage source for conduction between its collector and emitter leads to heat said second diode on said second chip, an operational amplifier having its inverting input terminal electrically connected between said first constant current source and said first diode-connected transistor, its noninverting input terminal electrically connected between said second constant current source and said second diode-connected transistor and its output terminal electrically connected to the base of said heater transistor on said second chip, said amplifier responsive to the voltage difference across its input terminals for supplying base current to said heater transistor to heat and maintain said second diode-connected transistor on said second chip at a predetermined temperature difference above said first diode-connected transistor on said first chip;

and utilization means responsive to the current flowing through said transistor heating means as a measure of the mass rate of fluid flow through the conduit.

7. A solid state fluid flow sensor according to claim 6 wherein said utilization means is responsive to the current flowing in the collector-emitter circuit of said heater transistor.

* * * * *